Patented Mar. 17, 1953

2,632,010

UNITED STATES PATENT OFFICE 2,632,010

N-ALKYL THIOPHENEACRYLAMIDES

Loren M. Long, Grosse Pointe Woods, and Charles A. Miller, Detroit, Mich., assignors to Parke, Davis & Company, Detroit, Mich., a corporation of Michigan No Drawing. Application April 19, 1951, Serial No. 221,938

5 Claims. (Cl. 260—332.2)

This invention relates to N-alkyl thiopheneacrylamides and to methods for obtaining same. More particularly, the invention relates to N-alkyl thiopheneacrylamides having valuable therapeutic properties and characterized by a particular type of branched carbon chain in the N-alkyl substituent. This particular class of compounds has the formula,

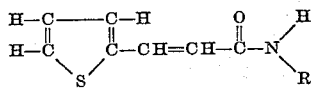

where R is an isopropyl, secondary butyl, or secondary amyl radical.

We have discovered that the compounds of the present invention are particularly useful in the treatment of petit mal epilepsy in that they possess an extremely high degree of anticonvulsant activity coupled with low toxicity and freedom from depressive side effects. The products of the invention find application when administered orally to human beings in doses of about 1-3 g. daily. Such therapy affords protection against convulsive seizures peculiar to petit mal epilepsy.

The compounds of the present invention may be prepared in several different ways. For example, a 2-thiopheneacrylic acid ester may be allowed to react with an appropriate primary branched-chain alkyl amine; the free acid may be caused to react with the appropriate amine by heating the two reactants; 2 - thiopheneacrylamide may be alkylated with an appropriate branched-chain alkyl halide; or a 2-thiopheneacrylic acid halide may be condensed with the appropriate alkyl amine. For most purposes we have found the last method to be the most satisfactory from the standpoint of yields and simplicity. This process may be illustrated diagrammatically as follows:

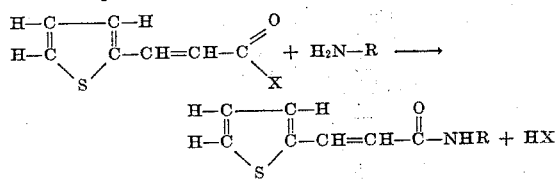

where R is an isopropyl, secondary butyl or secondary amyl radical and X is a halogen atom.

The process shown above may be carried out in several different ways and in a variety of solvents. Some of the solvents which may be used are water, ethanol, n-propanol, ethyl ether, dioxane, benzene, toluene, petroleum ether, chloroform, carbon tetrachloride and the like. It is preferable to use two equivalents of the amine reactant for each equivalent of the acid halide in the reaction. However, when the amine is expensive or difficult to obtain, one equivalent of a basic material may be substituted for one-half of the amine and in such a case the basic material reacts with the hydrogen halide formed during the reaction. Some examples of suitable basic materials are triethylamine, pyridine, dimethylaniline, anhydrous potassium carbonate, anhydrous sodium carbonate and the like.

The starting materials of the present invention, the 2-thiopheneacrylic acid halides, may be prepared readily from the known 2-thiopheneacrylic acid by reaction of the latter acid with halogenating agents such as phosphorus pentabromide, phosphorus oxychloride, thionyl chloride, and the like. The reaction may be carried out with or without a solvent. When a solvent is employed, a non-polar one such as benzene, ethyl ether, petroleum ether, or carbon tetrachloride is usually chosen.

The invention is illustrated by the following examples.

*Example 1.—N-isopropyl-2-thiopheneacrylamide*

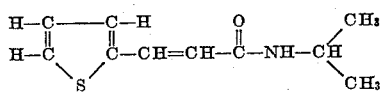

2 l. of thionyl chloride is placed in a flask equipped with a reflux condenser and a hydrogen chloride trap. Over a period of one-half hour, 880 g. of 2 - thiopheneacrylic acid is added in 100-g. portions. The mixture is heated on a steam bath until a clear solution is formed. The excess thionyl chloride is removed in vacuo and the dark residue distilled at 6 mm., avoiding excess heating. The product is collected at 128–130° C. at 6 mm. Yield: 770 g. (80% of theoretical).

540 g. of isopropylamine and 800 ml. of benzene are placed in a flask equipped with a stirrer, dropping funnel and a condenser. The flask and contents are cooled in an ice bath and stirred while 760 g. of 2-thiopheneacrylic acid chloride prepared above is dissolved in 1 l. of benzene and added over a period of three hours. After the addition is complete, the mixture is stirred for two hours and then filtered. The filtrate is evaporated in vacuo to one-third the original volume, cooled and filtered. The combined residues are agitated with 2 l. of water, filtered and washed with 1 l. of petroleum ether. The product is then washed with 500-ml. portions of saturated aqueous sodium bicarbonate solution, water, 1 N hydrochloric acid and finally with water. The white crystalline product after drying weighs 690 g. (80%), M. P. 125–7° C.

*Example 2.—N-sec-butyl-2-thiopheneacrylamide*

$$\text{thiophene-CH=CH-C(O)-NH-CH(CH}_3\text{)(CH}_2\text{CH}_3\text{)}$$

9.0 g. of sec-butylamine and 100 ml. of anhydrous ethyl ether are stirred and cooled while 9.0 g. of 2-thiopheneacrylic acid chloride in 30 ml. of anhydrous ethyl ether is added over a period of 15 minutes. The mixture is stirred for one hour after complete addition. The mixture is filtered and the filtrate evaporated to dryness. The residue is stirred with 25 ml. of water and filtered. The product is crystallized from 50% ethanol and then dried; weight, 9 g. (82%), M. P. 123–4° C.

*Example 3.—N-(1 - methylbutyl) - 2-thiopheneacrylamide*

$$\text{thiophene-CH=CH-C(O)-NH-CH(CH}_3\text{)(CH}_2\text{CH}_2\text{CH}_3\text{)}$$

A solution of 15 g. of 2-thiopheneacrylic acid in 100 ml. of benzene is treated with 28 g. of phosphorus pentabromide added in several portions. After the initial reaction subsides, the mixture is refluxed for two hours on the steam bath. The benzene is removed by concentration in vacuo and the residue is distilled fractionally to obtain 2-thiopheneacrylic acid bromide.

9.2 g. of 1-methylbutylamide in 120 ml. of water is stirred thoroughly and cooled in an ice bath during the addition of 10.5 g. of 2-thiopheneacrylic acid bromide dissolved in 35 ml. of ethyl ether. The ethereal extracts are combined, washed with water, aqueous sodium bicarbonate solution, water, dilute hydrochloric acid, and finally water. The organic solution is dried over sodium sulfate and concentrated to dryness. The residue is recrystallized from aqueous ethanol to give the crystalline N-(1-methylbutyl)-2-thiopheneacrylamide.

*Example 4.—N-(1 - ethylpropyl) - 2-thiopheneacrylamide*

$$\text{thiophene-CH=CH-C(O)-NH-CH(CH}_2\text{CH}_3\text{)}_2$$

18.4 g. of 1-ethylpropylamine and 75 ml. of carbon tetrachloride are cooled in an ice-bath and stirred while 17.2 g. of 2-thiopheneacrylic acid chloride dissolved in 35 ml. of carbon tetrachloride is added over a period of one-half hour. The reaction mixture is allowed to stir for one hour and is heated to reflux for one more hour. The solvent is then removed by concentration in vacuo. The residue is taken up in ethyl ether and the solution is washed with dilute hydrochloric acid, water, aqueous sodium bicarbonate solution and finally water. The organic fraction is dried and concentrated to dryness. The residue is recrystallized from aqueous propanol to obtain in crystalline form the N-(1-ethylpropyl)-2-thiopheneacrylamide.

What we claim is:

1. A compound of the formula, $$\text{thiophene-CH=CH-C(O)-NHR}$$

where R is a member of the class consisting of isopropyl, secondary butyl, and secondary amyl radicals.

2. A compound of the formula, $$\text{thiophene-CH=CH-C(O)-NH-CH(CH}_3\text{)}_2$$

3. A compound of the formula, $$\text{thiophene-CH=CH-C(O)-NH-CH(CH}_3\text{)(CH}_2\text{CH}_3\text{)}$$

4. A compound of the formula, $$\text{thiophene-CH=CH-C(O)-NH-CH(CH}_3\text{)(CH}_2\text{CH}_2\text{CH}_3\text{)}$$

5. A compound of the formula, $$\text{thiophene-CH=CH-C(O)-NH-CH(CH}_2\text{CH}_3\text{)}_2$$

LOREN M. LONG.
CHARLES A. MILLER.

REFERENCES CITED

The following references are of record in the file of this patent:

UNITED STATES PATENTS

| Number | Name | Date |
|---|---|---|
| 2,224,243 | Bowen | Dec. 10, 1940 |
| 2,354,193 | Bowen | July 25, 1944 |

OTHER REFERENCES

Caesar et al.: Ind. Eng. Chem. 40, March 1948, page 922.

Alles: J. of Pharm. and Exp. Ther., vol. 72, p. 265 (1941).

Bernthsen et al.: "Organic Chemistry," p. 549, pub. by Van Nostrand, N. Y., 1925.

Kaneo et al.: J. Pharm. Soc. (Japan), vol. 58, (1938) pp. 261–264.

Ex parte Middleton Patent File 2,524,674, p. 19, 6 pp.